Figure 1:
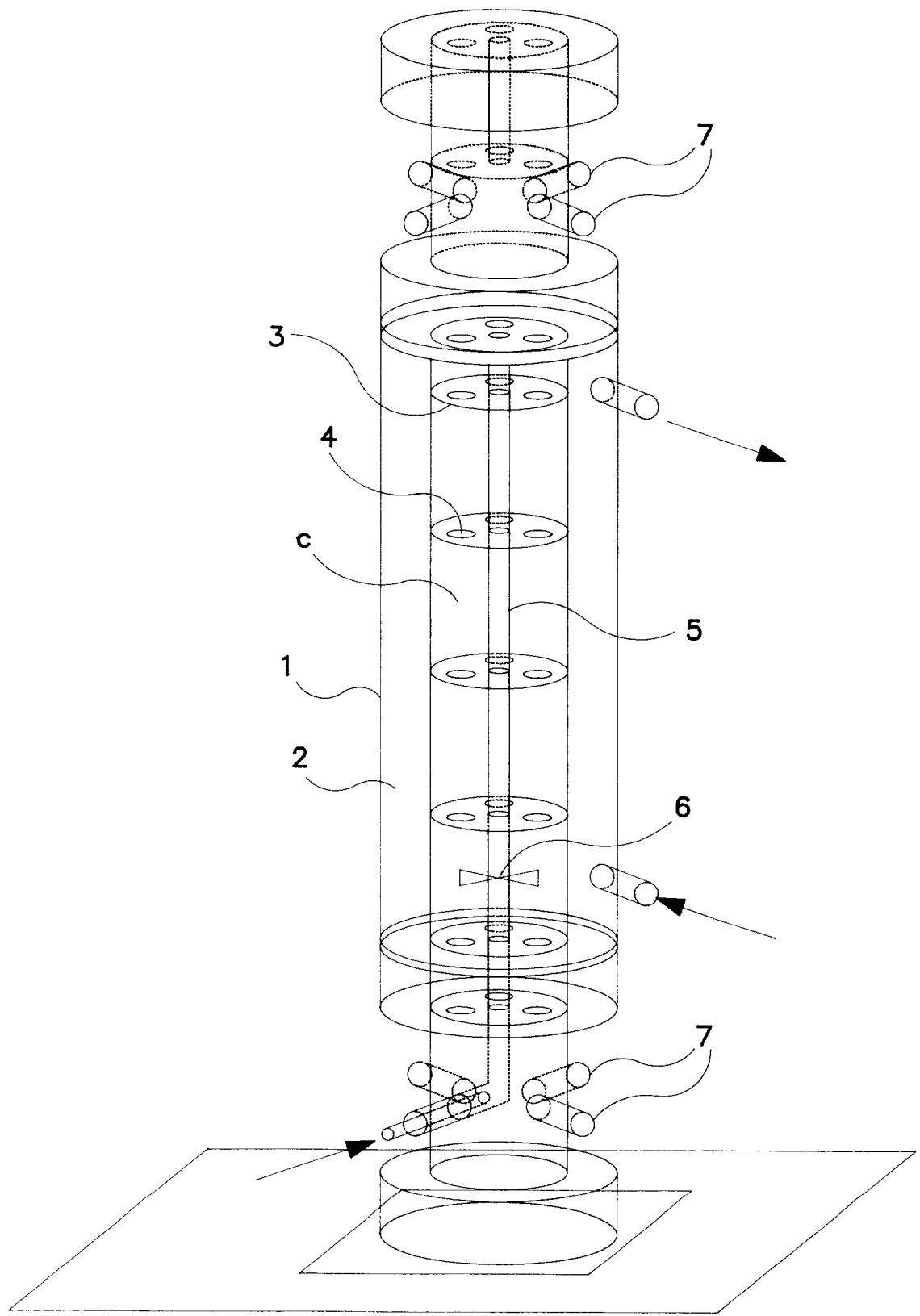

United States Patent
Bertelo et al.

[11] Patent Number: 6,114,415
[45] Date of Patent: Sep. 5, 2000

[54] METHOD FOR PRODUCING COAGULATED POLYMER LATEX PARTICLES

[75] Inventors: Chris Bertelo, Scotch Plains, N.J.; Laurent Gervat, Paris; Jérôme Laffont, Biarritz, both of France; Malcolm Robert Mackley, Cambridge, United Kingdom; Gilles Meunier, Mazerolles, France

[73] Assignee: Elf Atochem, S.A., Paris-la-Defense Cedex, France

[21] Appl. No.: 09/029,037

[22] PCT Filed: Jun. 2, 1997

[86] PCT No.: PCT/FR97/00959

§ 371 Date: Jun. 3, 1998

§ 102(e) Date: Jun. 3, 1998

[87] PCT Pub. No.: WO97/46607

PCT Pub. Date: Dec. 11, 1997

[30] Foreign Application Priority Data

Jun. 3, 1996 [FR] France .................................. 96 06815

[51] Int. Cl.⁷ .............................. C08J 3/16; B01F 15/02; B01F 5/00

[52] U.S. Cl. ......................... 523/335; 523/352; 528/483; 528/488; 366/182.1; 366/340

[58] Field of Search ...................... 523/335, 352; 528/483, 488; 366/340

[56] References Cited

U.S. PATENT DOCUMENTS

| | | |
|---|---|---|
| 4,043,955 | 8/1977 | Paster .................. 260/23.7 A |
| 4,623,678 | 11/1986 | Moore et al. ............ 523/352 |
| 4,832,500 | 5/1989 | Brunhold et al. ........ 366/268 |
| 4,874,841 | 10/1989 | Sugimori et al. ........ 528/491 |
| 4,890,929 | 1/1990 | Okada et al. ........... 366/160 |

FOREIGN PATENT DOCUMENTS

| | | |
|---|---|---|
| 0215321 | 3/1987 | European Pat. Off. . |
| 0288018 | 10/1988 | European Pat. Off. . |
| 2053929 | 2/1981 | United Kingdom . |
| 8700079 | 1/1987 | WIPO . |
| 9422567 | 10/1994 | WIPO . |

*Primary Examiner*—Tae Yoon
*Attorney, Agent, or Firm*—Millen, White, Zelano & Branigan, P.C.

[57] ABSTRACT

A batchwise or continuous process for producing coagulated particles of polymer latex, involves partially or completely filling at least one receptacle with a fluid A which can be water, a polymer latex emulsion or a coagulant solution, the receptacle being equipped with baffles containing at least one orifice, injecting into the receptacle at least one fluid other than the fluid of the preceding stage, the injected fluid being a polymer latex emulsion and/or a coagulant solution, and in then creating and maintaining within the receptacle an oscillatory flow or an impulsive flow, in conjunction with the formation of eddies or of vortices.

15 Claims, 6 Drawing Sheets

METHOD FOR PRODUCING COAGULATED POLYMER LATEX PARTICLES

The present invention relates to a process for producing coagulated particles of polymer latex.

Latexes of polymer origin obtained by emulsion polymerization or by other methods are generally provided in the form of aqueous colloid dispersions. These dispersions, using water as dispersing medium, contain solid or gelatinous particles, the size of which is generally between 0.1 and 3 microns. The dispersion is generally electrically charged. The addition of a coagulant makes it possible to coagulate or to flocculate these particles by neutralizing the forces which keep them separate.

Once clumps have been created, the size of which now exceeds 10 microns, they can be recovered by filtration, by drying or by any process which makes it possible to collect a powder. The addition of coagulant units to a polymer emulsion, or else the addition of polymer to a coagulant solution, requires a mixing process. Mixing is generally carried out with a conventional paddle stirrer.

However, this way of operating exhibits the following major disadvantages:

The powder obtained contains particles of irregular morphology and it cannot be hoped to obtain spherical shapes, which may result in problems if it is desired subsequently to manipulate this powder. Fines are also created. Consequently, later in the process, it may be necessary to solve problems such as blinding of the filtration system or obstruction of pneumatic transportation lines. High risks of explosion due to the presence of this dust can also be envisaged when the product is dried or alternatively contamination of the atmosphere of the work site. Moreover, they represent a permanent problem during the handling of the powder. Finally, if these fine particles are in fact removed, they cannot be used and therefore constitute a direct loss of product.

An improvement in this type of method was provided in Patent Application EP-A2-0,217,006, which consists in inducing the formation of bigger coagulated clumps by cautiously dispersing coagulant units in an aqueous colloid solution. The polymer particles thus coagulate at the surface of the coagulant units; the suspension obtained is subsequently passed through a sieve in order to obtain a more uniform particle size grading. However, by adding another process following the coagulation, problems inherent in this new conversion are encountered, such as the blinding of or the necessity of including cleaning cycles for the sieves, for example. Moreover, it turns out that, during a continuous operation, the simple addition of polymer emulsion and of coagulant to the stirred receptacle results in the formation of large masses of coagulates, in particular on the walls of the receptacle and on the paddles of the stirrer. These undesirable clumps are also observed in the bottom of the receptacle and can cause the drainage pipes to become blocked. Consequently, it appears difficult to implement a continuous operation under these conditions.

If simply pouring the coagulant on to the surface of the polymer latex emulsion is envisaged, the coagulant units have a tendency to float, due to surface tension, thus forming large amorphous grains and reducing the reaction yield and the quality of the product.

If the reverse is carried out, namely pouring the emulsion into the coagulant solution, it is observed that the particle size grading is very broad and that the particles have entirely irregular shapes, which is not desirable for a powder.

Another solution is provided in Patent EP-B1-0,288,018, which consists in producing a latex vortex, still using a paddle system. Latex is poured into the receptacle using a system of pouring spout type and, at the same time, a coagulant is sprayed into the descending latex flow.

The resulting mixture is composed of approximately spherical latex grains with a uniform size. This size is of the order of 3 to 5 mm in diameter. If the fact that polymer latexes are mainly used as additives for other polymer powders, which are much finer than 4 mm, is taken into consideration, it is understood that this size is a disadvantage which can only be avoided by the addition of another downstream process, such as passing through a sieve, with the problems mentioned above.

It is also known to recover latex particles by atomization. This technique is used in a device comprising a spraying system, supplied with latex emulsion, and a chamber in which the said system disperses the latex as fine droplets. In this atomization chamber, hot gases, generally air, come into contact with the latex and evaporate the fluid which constitutes the dispersing medium (generally water) contained in each drop. The sizes of the particles thus formed range between 30 and 150 microns.

This type of device makes it possible to obtain particles of narrow particle size grading and with a spherical morphology but it exhibits many problems.

Thus, in order to obtain efficient drying of the polymer, the temperature in the atomization chamber must be high, generally around 150° C. Now, high-density emulsions, containing for example between 40% and 60% by mass of polymer, are sensitive systems which have a tendency to form deposits and clumps of coagulate when they are subjected to high temperatures or to shear forces. Due to their sensitivity, difficulties may be encountered in atomizing certain polymer emulsions, such as, for example, unremovable deposits in the chamber or alternatively blinding of the spraying system. This makes it difficult to recover polymer latex particles from certain emulsions.

Improvements in this method, such as spraying coagulant at the same time or the movement of a fluid (water, for example) on the walls of the chamber in order to recover and cool the particles have been proposed. Nevertheless, the disadvantages are still a risk of blinding for highly concentrated emulsions, the volume of this type of equipment, the energy required and, as is the case for the first category of process (coagulation in receptacles stirred by paddles), the inability to quickly change the characteristics of the final powder in terms of particle size grading, morphology and porosity without stopping continuous production and without changing any item of equipment or moving from one to another.

One objective of this invention is thus to provide a process, the aim of which is to produce coagulated particles of polymer latex from polymer emulsions during a batchwise or continuous operation.

A batchwise or continuous process has now been found for producing coagulated particles of polymer latex from a polymer emulsion and from a coagulant solution, characterized in that the following successive stages are carried out:

1) partially or completely filling at least one horizontal or vertical receptacle with a fluid A chosen from the group composed of a polymer latex emulsion, a coagulant solution, water, an oil or supercritical carbon dioxide, the said receptacle being divided into a succession of compartments separated by stationary or movable baffles or plates arranged at axial intervals containing at least one orifice;

2) injecting into the said receptacle at least one fluid other than the fluid of Stage 1), the said injected fluid being a polymer latex emulsion and/or a coagulant solution;

3) creating and maintaining within the said receptacle an oscillatory flow or an impulsive flow, in conjunction with the formation of eddies or of vortices.

According to the present invention, oscillatory flow denotes a periodic or aperiodic movement which can be initiated along a given direction and in two opposite senses and can be maintained along the said given direction and alternately in the two opposite senses.

According to the present invention, impulsive flow denotes a period or aperiodic movement which can be initiated along a given direction but in a single sense, the fluid travelling the same said direction but in the other sense in order to return to its starting position, and which can comprise a period of rest of the fluid, or of the baffles, or of both, between two impulsions.

According to the present invention, the operation can be carried out batchwise or continuously.

In the eventuality of a continuous operation, the polymer latex emulsion and the coagulant solution are preferably injected, separately and simultaneously.

According to the present invention, the receptacle may be completely filled or alternatively only a fraction of the volume of the said receptacle may be filled, which fraction may vary within wide limits. This fraction is preferably at least equal to 50% of the volume of the said receptacle.

According to the present invention, the temperature of the polymer latex is advantageously the temperature maintained in the said receptacle. It must be less than the melting temperature of the polymer. Melting temperature is understood to mean the temperature at which the latex particles fuse together at atmospheric pressure.

The latexes which can be used according to the present invention are polymer latexes obtained by emulsion or suspension polymerization and which can be recovered in a resinous state.

The simple latexes or polymer latex mixtures obtained by polymerization, copolymerization or polymerization with grafting of compositions containing monomers comprising one or a number of components of the monomers selected from the groups mentioned below may also be used. Mention may be made, by way of illustration of such latexes, of latexes, and mixtures of the latter, of polymers or of copolymers (including grafted copolymers) or of polymers of core-shell type which are composed of at least one of the following monomers: vinylaromatic monomers, such as styrene, monochlorostyrene, dichlorostyrene or a-methylstyrene; cyanovinyl monomers, such as acrylonitrile and methacrylonitrile; acrylates, such as methyl, ethyl and butyl acrylates; methacrylates, such as methyl, ethyl and butyl methacrylates; vinyl halides, such as vinyl bromide, vinyl chloride and vinyl fluoride; vinylidene halides, such as vinylidene chloride, vinylidene bromide, vinylidene fluoride or vinylidene difluoride; acrylic acid, methacrylic acid, itaconic acid, maleic acid, vinyl acetate, ethylene, propylene, butylene, butadiene, isoprene and chloroprene; and graftable monomers, such as allyl methacrylate, diallyl phthalate, triallyl cyanurate, monoethylene glycol dimethacrylate, tetraethylene glycol dimethacrylate, divinylbenzene and glycidyl methacrylate.

Use will preferably be made, among the latter, of the following polymer latexes:
a polymer latex obtained by polymerizing from 50 to 90% (the percentage in this case and subsequently being by mass) of butyl acrylate, from 0% to 20% of butadiene and from 0% to 30% of a component from vinyl chloride, vinylidene chloride, vinyl bromide and vinylidene bromide; and from 0% to 10% of a chromophore monomer;

a polybutadiene or butadiene copolymer latex composed of 0 to 50% of styrene and of 50% to 100% of butadiene;

a polymer latex obtained by polymerizing, in the presence of 20% to 90% of one of the latexes described above as core, from 10 to 80% of a mixture of monomers composed of 0% to 50% of an acrylate, of 0% to 100% of a methacrylate, of 0% to 90% of a cyanovinyl monomer and of 0 to 50% of another copolymerizable monomer, preferably styrene, as shell;

a polymer latex obtained by polymerizing, in the presence of an elastomer latex composed of 0 to 50% of styrene, of 50% to 100% of butadiene and of 0% to 30% of an acrylate, 20% to 80% of a mixture of monomers composed of 0% to 100% of methyl methacrylate, of 0% to 60% of an acrylate or of a methacrylate other than methyl methacrylate, of 0% to 90% of a vinylaromatic monomer and of 0% to 90% of a cyanovinyl monomer.

According to the present invention, the concentration by weight of polymer in the emulsions can vary within wide limits. It is between 10% and 60% and, preferably, between 20% and 40%.

The coagulants which can be used according to the present invention are in the form of solids or of liquids.

Mention may be made, as coagulants which can be used according to the present invention, of inorganic salts, such as sodium chloride, potassium chloride, lithium chloride, sodium bromide, potassium bromide, lithium bromide, potassium iodide, potassium sulphate, ammonium chloride, sodium nitrate, potassium nitrate, calcium chloride, ferrous sulphate, magnesium sulphate, zinc sulphate, copper sulphate, barium chloride, ferrous chloride, magnesium chloride, ferric chloride, ferric sulphate, aluminium sulphate, potassium aluminate or iron aluminate; inorganic acids, such as hydrochloric, sulphuric, phosphoric or nitric acid; inorganic bases, such as sodium hydroxide, potassium hydroxide, calcium hydroxide or magnesium hydroxide; organic acids, such as acetic and formic acids; and salts of organic acids, such as sodium acetate, calcium acetate, sodium formate and calcium formate. These coagulants can be used without distinction alone or in combination, in the form of solutions in water or in a water-miscible organic solvent or alternatively in the form of suspensions in a water-soluble organic solvent.

The process according to the present invention can be implemented in a device as described in Patent Application GB 93/06472 and Patent EP-B1-229,139, incorporated here for reference.

When the operation is carried out batchwise, use will advantageously be made of a device as represented in FIG. (1). This vertical cylindrical device 1, with height H and internal diameter D such that H/D is greater than 1, is equipped with a jacket 2 in which a heat-transfer fluid, such as water, circulates. The said receptacle is divided into a succession of compartments C separated by baffles 3 equipped with at least one orifice 4.

The said baffles 3 can be fixed to a central pipe 5 equipped with holes 6, the number of which can vary within wide limits. The baffles, which are identical or different, can be placed at equal or at different distances from one another.

It would not be departing from the scope of the invention if the said baffles were movable.

Injection of the polymer latex emulsion is carried out via the pipe 5 perforated with holes 6. In the configuration shown in FIG. (1), this pipe 5 forms an angle of 90 degrees in the lower part of the said receptacle. A piston situated at the base of the receptacle 1 (not shown in FIG. (1)), mounted so that it is leakproof with the internal wall of the receptacle but sliding against the latter, imposes an oscillatory movement on the contents of the receptacle.

The receptacle is equipped with pipes 7 in its lower and upper parts. These pipes can be used either for filling the said receptacle with the fluid A or the coagulant solution of Stage 2, or for recovering the coagulated particles of polymer latex.

The mixture of the fluid A and of the suspended particles is subjected to impulsions or to oscillations, which result in the mixture reaching a stationary state in which uniform characteristics are established in each compartment; however, there exists a preestablished relationship between the values of these characteristics when moving from one compartment to another. The parameters are chosen so as preferably to have a chaotic and uniform flow within the receptacle. Chaotic flow is understood to mean a flow in which adjacent fluid components must separate from one another exponentially, instead of linearly in the case of a simple stationary shear flow. In order to generate chaotic flow in a tube equipped with baffles, the oscillatory Reynolds number, $Re_o$, given by the formula:

$$Re_o = \frac{\omega \times x_o \times D}{\nu}$$

in which D is the internal diameter of the tube, $\omega$ the angular frequency of the oscillations, $x_o$ is the amplitude of the oscillations and $\nu$ the kinematic viscosity, must be equal to at least 150.

The oscillations of the fluid in the receptacle or of the baffles can be caused by a piston, the movement of which can be adjusted in terms of travel of the piston (resulting in the amplitude of the oscillations) or of frequency of movement (resulting in the frequency of the oscillations), so as to obtain quantitative control of the mixing conditions as explained above.

According to the present invention, in order to obtain relative movement between the fluid and the baffles, the said piston can move the fluid in the receptacle whereas the baffles are stationary or alternatively can move all or some of the baffles whereas the fluid remains in place or both at the same time. There exists a wide range of mechanisms which can provide for the movement of this piston; mention will be made, for example, of mechanical, pneumatic, hydraulic or electromagnetic systems.

In the case where the operation is carried out continuously, a device as represented in FIG. (2) is used.

This device is composed of two receptacles 1a and 1b connected by an elbow 8 which can contain baffles.

The receptacle 1a is identical to the receptacle 1 in FIG. (1).

The receptacle 1b contains a central pipe 5b which does not contain holes. However, in another configuration, this pipe 5d could be perforated with holes for supplementary addition of another coagulant.

The coagulated particles of polymer latex are collected via pipes 9 situated in the lower part of the receptacle.

Samples can be taken via the pipes 10 situated in the upper part of the receptacle 1b.

A baffle has been "magnified M" in this FIG. (2) in order to display the behaviour of the fluid within the receptacles and the vortices formed by passage of the fluid into the orifices of the baffles which are essential for the efficiency of the mixing.

Whether the operation is carried out batchwise or continuously, the direction of injection of the polymer latex emulsion can form an angle ranging from 0 to 180 degrees with the direction of the oscillations, that is to say with the travel of the piston causing the oscillations.

Figure 2:
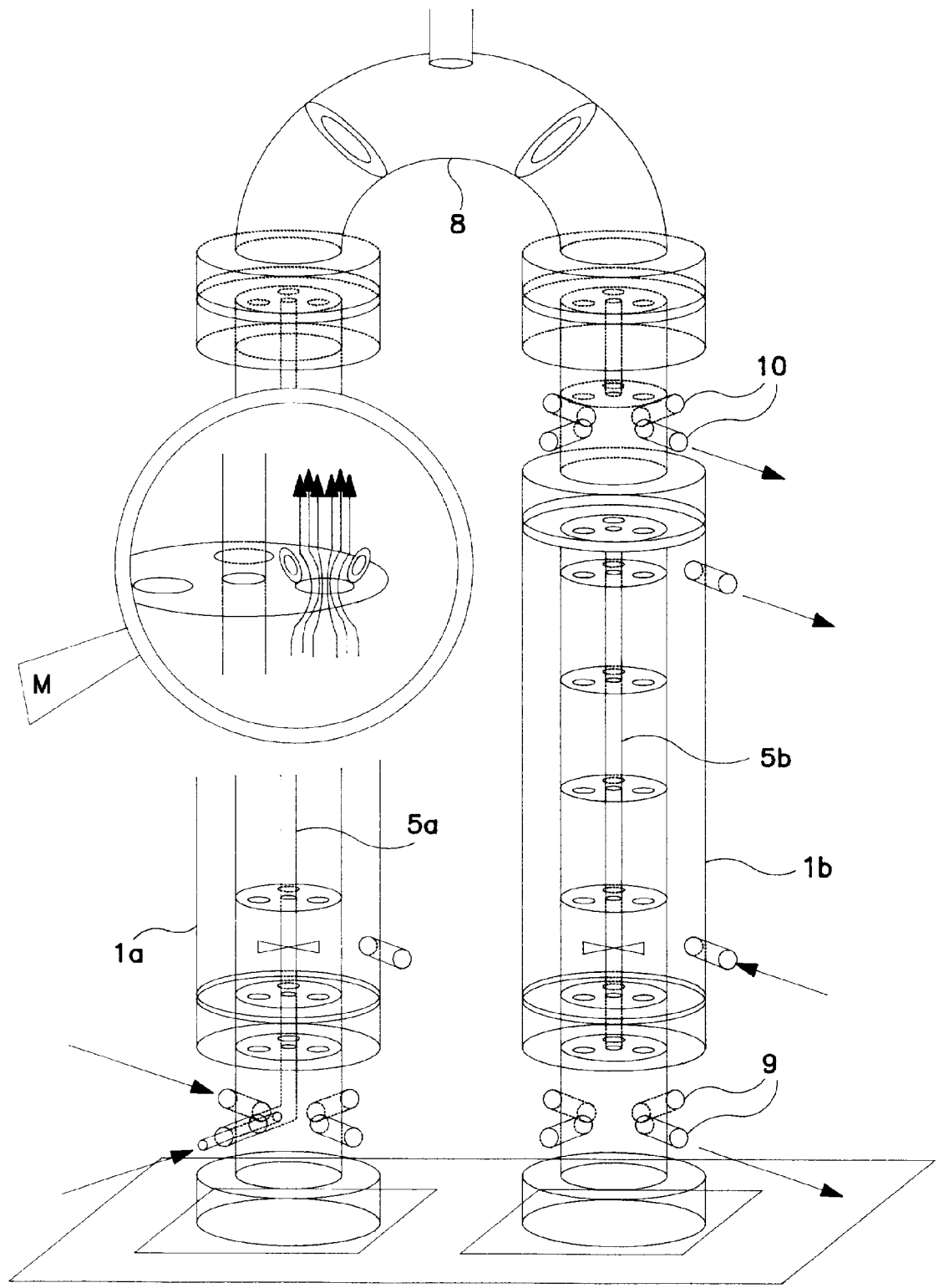

According to the present invention, the receptacle is filled, depending on the type of test envisaged, that is to say batchwise or continuous (in this case, it is the receptacle 1a in FIG. 2), with a coagulant solution or a polymer latex emulsion or fluid A.

It is possible to fill only a fraction of the volume of the receptacle with the fluid A or alternatively the entire volume.

It will not be departing from the scope of the invention if the polymer latex emulsion or the coagulant solution was injected via nozzles.

The process according to the present invention has the advantage of resulting in a narrow distribution of the sizes of the particles obtained, which means in particular the absence of fine particles or of large clumps. This process also has the advantage of exhibiting great flexibility, due to the fact that it is possible to use a number of receptacles which can contain baffles of different geometry resulting in suitable separation of the flows in an oscillatory flow to result in a uniform mixture.

It also has the advantage of resulting in particles of spherical shape, which facilitates the handling of the powder once dried.

The examples which follow illustrate the invention.

EXAMPLE 1

The operation is carried out batchwise with the device represented in FIG. (1).

The height H of the receptacle is 600 mm and the internal diameter D is 50 mm.

The baffles, to the number of 10, with a diameter equal to approximately 50 mm, are arranged 50 mm from one another. They contain 3 circular orifices with a diameter equal to 13 mm.

The pipe 5 contains two holes 6 with a diameter of 1 mm situated at the foot of the said pipe.

The receptacle was filled to half its volume with a 5 g/l calcium chloride coagulant solution; the latex emulsion was then injected over approximately one hour, at 1 l/hr, until the receptacle had been completely filled. In this test, the latex emulsion is dispersed through the two holes arranged at the foot of the pipe 5 which supports the baffles in the receptacle. The direction of injection of the polymer emulsion forms an angle of 90 degrees to the direction of the oscillations. The characteristics of the oscillatory mixing are adjusted to a frequency of 2.4 Hz and an amplitude of 11 mm. The latex emulsion is composed, on average, of 20% by mass of a polymer of core-shell type obtained by polymerizing 80% of butyl acrylate and 20% of methyl methacrylate. The temperature maintained in the receptacle during the experiment is set at 60° C.

The particle size grading of the particles obtained is narrow, the commonest size being approximately 130 microns.

The particle size gradings of the particles were determined on a Coulter® type N4 device with a laser beam as light source.

EXAMPLE 2

In this example, still batchwise, all the characteristics of the configuration of the device are the same. The concentration of the coagulant solution has been changed to 7.5 g/l. The temperature, the fluid flow rate, the nature of the polymer and the intensity of the mixing, characterized by the frequency and the amplitude of the oscillations, are the same. The particle size grading of the particles obtained remains narrow, with an increase in the majority size to approximately 150 microns.

EXAMPLE 3

Carried out batchwise, according to the conditions of the process and the configuration of the device which are identical to the first example. The intensity of the mixing has an amplitude of 8 mm, still with a frequency of the oscillations of the fluid of 2.4 Hz. These mixing conditions can be qualified as milder than those of Examples 1 and 2.

Figure 3:
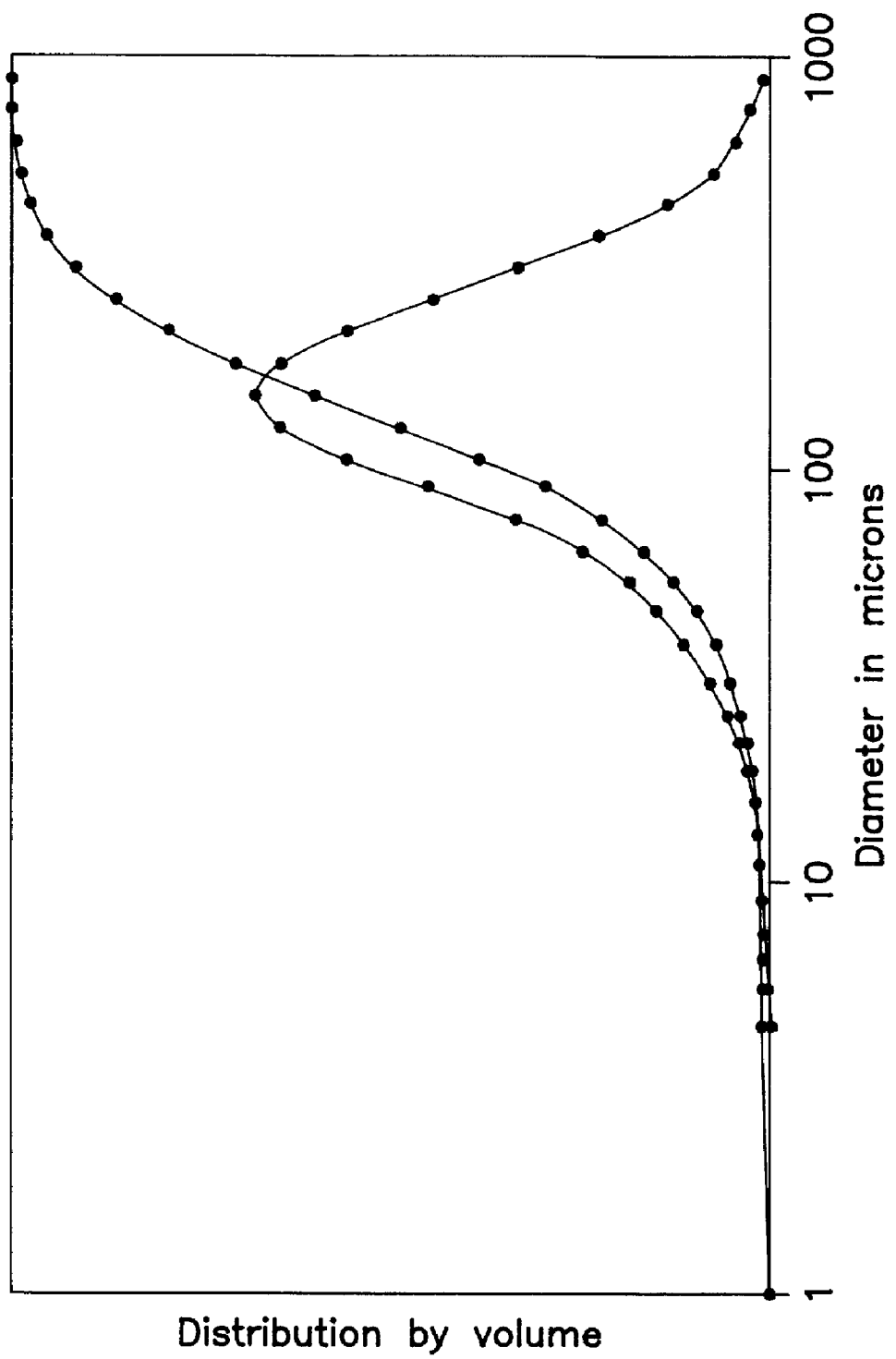

The particle size grading of the particles obtained, represented in FIG. 3, is narrow and the characteristic size of the particles (the diameter of which, expressed as microns, is represented on the abscissa) is approximately 160 microns.

EXAMPLE 4

The operation is carried out continuously. The test lasted seven hours. The operation is carried out in the device represented by FIG. (2). At the foot of the left-hand receptacle 1a, the latex emulsion was injected continuously through the holes in the pipe 5a perforated with 8 holes with a diameter equal to 1 mm, with a flow rate of 1.2 l/hr, and a coagulant solution was continuously injected at a different position with a flow rate of 4.2 l/hr. The suspension of coagulated particles of polymer latex thus formed was recovered at the foot of the right-hand receptacle 1b. The geometry of the baffles and their spacing are the same as above. Baffles are installed in the two receptacles and in the elbow connecting them. The coagulant is a 5 g/l calcium chloride solution and the polymer used is the same as in the preceding examples, with dilution bringing the concentration of polymer to approximately 10% by mass.

The receptacles 1a and 1b and the elbow were entirely filled beforehand with distilled water. Due to the continuous processing conditions, it is no longer necessary to have a coagulant in the receptacle before introducing the latex emulsion. The presence of distilled water in the receptacle when the two products begin to be introduced prevents any risk of formation of large coagulated clumps, especially when working with emulsions containing a high solid concentration (40 to 60% by mass, for example), these clumps being undesirable if it is desired subsequently to obtain a homogeneous powder. Quite the contrary, during the replacement of the starting volume of distilled water, that is to say after approximately one hour, a stationary coagulation state is established, which produces regular particles of spherical shape with a narrow size distribution.

Figure 4:
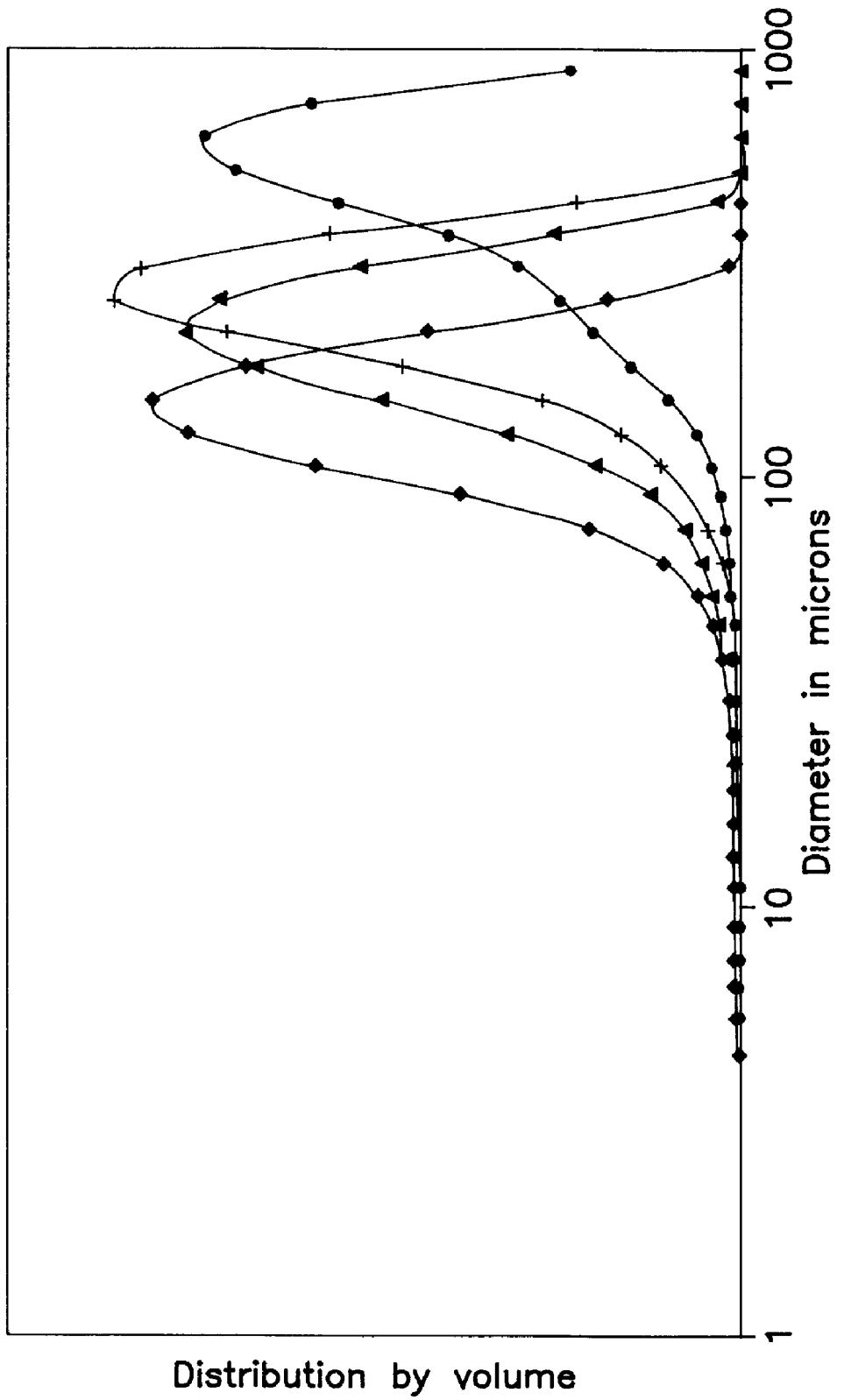

As regards the intensity of the mixing, it was changed every hour by varying either the frequency or the amplitude of the oscillations and there was a wait of one hour after the change in order to take a sample corresponding to the production of particles under these different mixing conditions. This time of one hour corresponds to the residence time of the particles in the reactor. It can be related to the total flow rate of fluids, i.e. 5.4 l/hr, and to the total volume of the receptacle in this continuous configuration, which is approximately six litres. For example, the range of the amplitudes explored is from 4 to 18 mm and that of the frequencies from 2.4 to 3.7 Hz. The particles thus obtained are virtually spherical. No coagulate clump was observed and no uncoagulated or insufficiently coagulated fine particles either. No deposition anywhere in the receptacle, for example on the baffles, was observed. No blinding of the injection orifices or of the discharge orifices, or orifices for exit of the product, was observed. Moreover, the distributions of the sizes of the particles formed, represented on the curves in FIG. 4, are both narrow and entirely controlled by the intensity of the mixing. This shows that it is possible to produce different types of coagulated particles, in the event of a change in demand, simply by adjusting, without even halting production, the mixing conditions. After a residence time has elapsed, a different powder range, with the same advantageous characteristics as for the particles mentioned above, is produced.

EXAMPLE 5

This example was carried out continuously with the equipment of Example 4. The conditions of the mixing were set at 11 mm and 2.4 Hz respectively for the amplitude and the frequency of the oscillations. The polymer latex emulsion is more concentrated. The concentration by weight of polymer in the emulsion is equal to 20%. All the advantages found in Example 4 were observed in this example.

Figure 5:
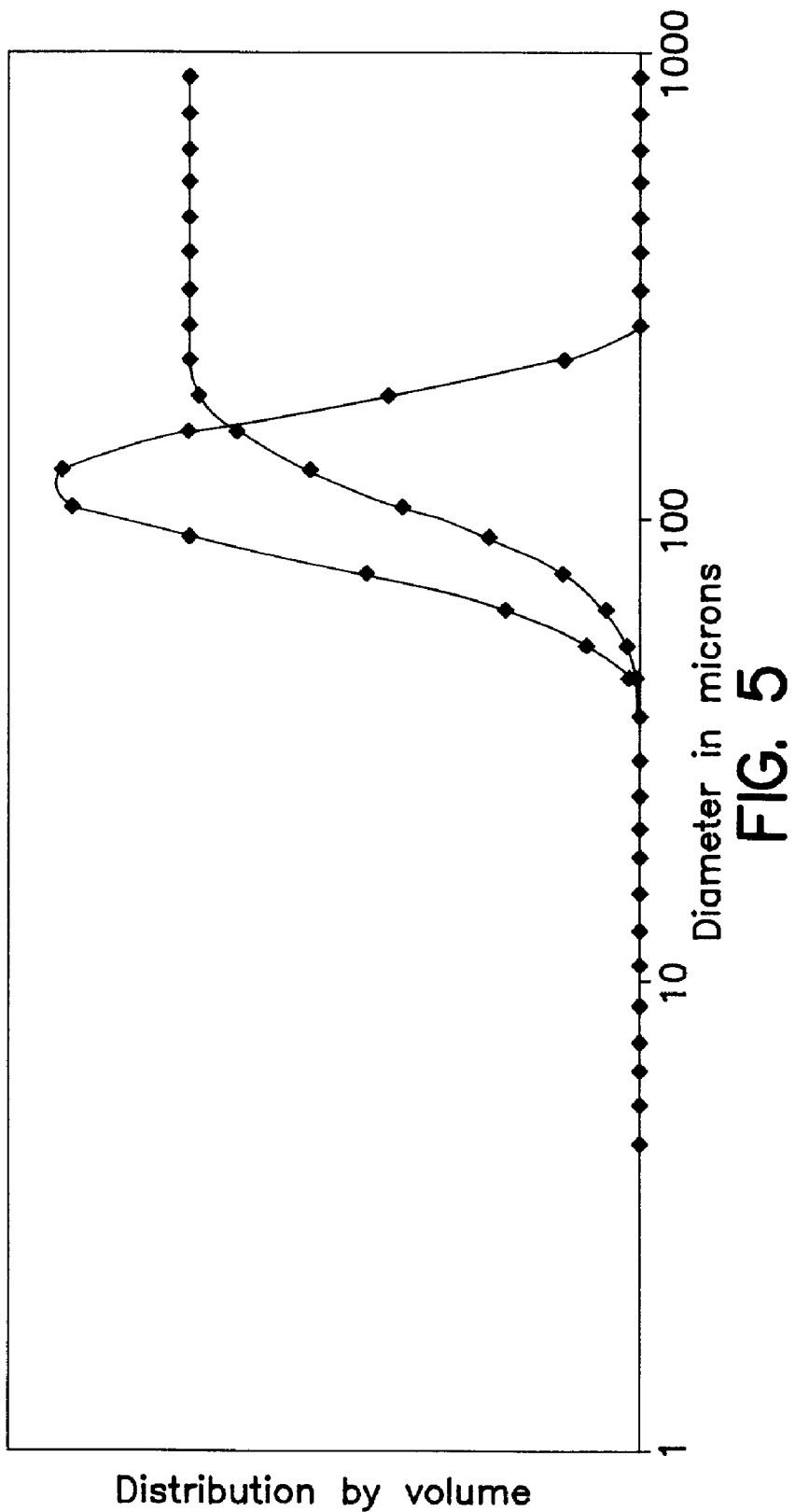

The particle size grading of the particles obtained, represented in FIG. 5, is very narrow, without any fine particle or large coagulate clumps.

EXAMPLE 6
(not in accordance with the invention)

Figure 6:
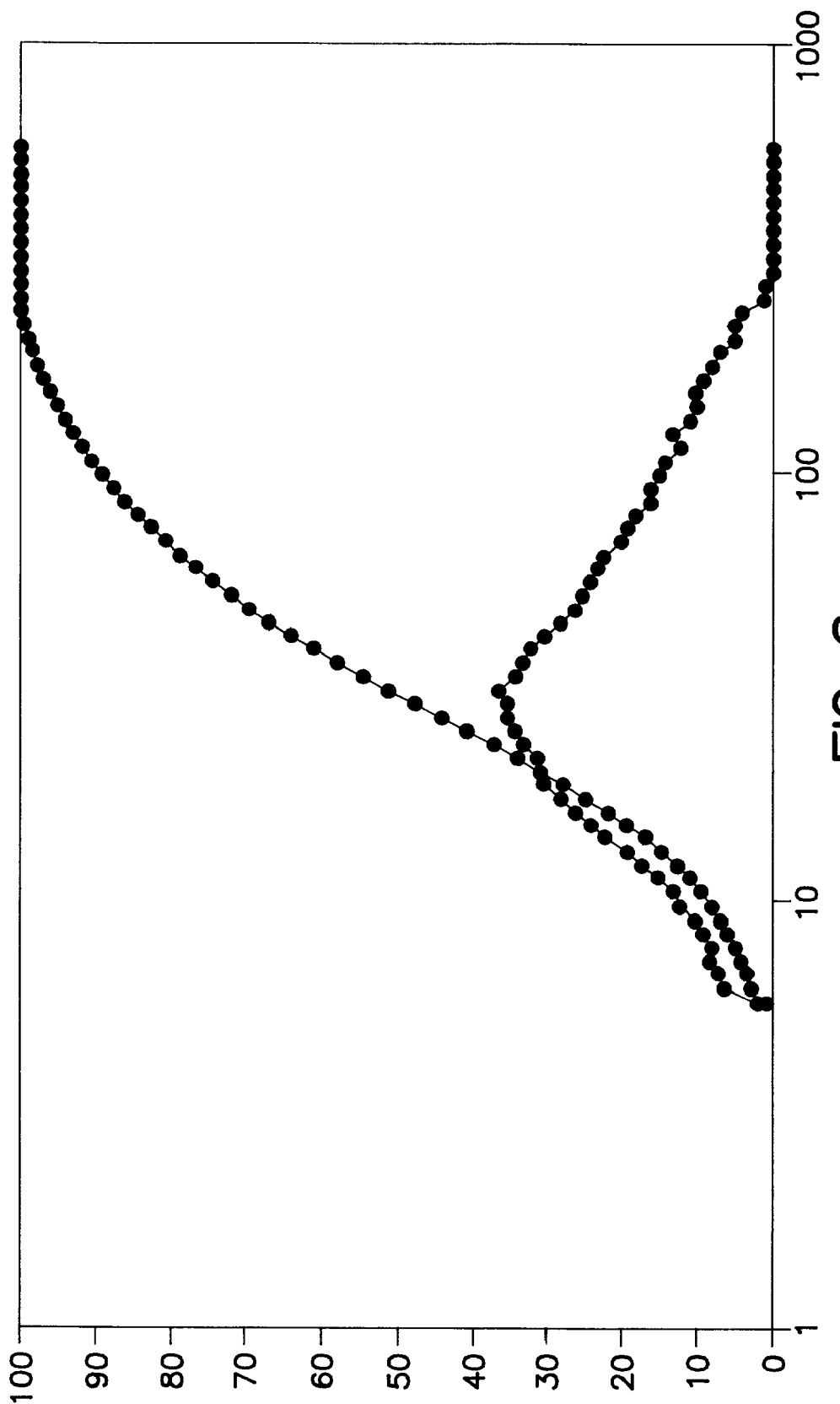

A batchwise experiment was carried out using a conventional reactor stirred by a paddle system in order to coagulate the same polymer emulsion, with a concentration of 40% by mass. The description of this test is as follows:

The reactor was filled with 600 g of distilled water, to which was added calcium chloride in order to reach a concentration of 10 g/l. The reactor is brought to a temperature of 60° C. and the rate of rotation of the stirrer is set at the start at 500 revolutions/minute. 450 g of latex emulsion, diluted with 150 g of distilled water, were added over approximately 1 h 30 min. During this addition, the speed of the stirrer was brought to 1000 rev/min, due to the thickening of the suspension. After having cooled the suspension, the product was dried and the distribution of the sizes of the particles thus formed was measured; in addition, the product was observed with an electron microscope. It is found that the particle size grading, represented in FIG. 6, is very broad, the characteristic size is in the region of 30 microns and the particles are completely amorphous.

Moreover, no control of the final size of the particles can be envisaged with this type of device.

What is claimed is:

1. A batchwise or continuous process for producing coagulated particles of polymer latex from a polymer emulsion and from a coagulant solution, comprising the following successive stages:

1) partially or completely filling at least one horizontal or vertical receptacle with a fluid A chosen from the group consisting of a polymer latex emulsion, and coagulant solution, water, an oil or supercritical carbon dioxide, the said receptacle being divided into a succession of compartments separated by baffles or plates arranged at axial intervals containing at least one orifice with the provision that when the process is conducted batchwise, the filling is partial;

2) injecting into the said receptacle at least one fluid other than the fluid of Stage 1), the injected fluid being a polymer latex emulsion and/or a coagulant solution;

3) creating and maintaining within the said receptacle an oscillatory flow or an impulsive flow, in conjunction with the formation of eddies or of vortices.

2. A process according to claim 1, wherein, in Stage 1, the receptacle is completely filled with the fluid A and the process is continuous.

3. A process according to claim 1, wherein, in Stage 1, the receptacle is filled to at least 50% of its volume.

4. A process according to claim 1, wherein, when operating batchwise, the fluid A is a calcium chloride coagulant solution and the fluid injected in Stage 2 is a polymer emulsion and, when operating continuously, the fluid A is water and in that, in Stage 2, a polymer latex emulsion and a coagulant solution are injected, separately and simultaneously.

5. A process according to claim 1, wherein the concentration by weight of polymer in the emulsion is between 10% and 60%.

6. A process according to claim 1, wherein the polymer of the latex emulsion is a core-shell polymer wherein both the core and the shell are obtained by polymerization of 80% of butyl acrylate and of 20% of methyl methacrylate.

7. A process according to claim 1, wherein the oscillatory flow or the impulsive flow is created by moving the fluid within the receptacle according to the said oscillations or impulsions.

8. A process according to claim 1, wherein the polymer latex emulsion is injected within the fluid which is found in the said receptacle via a pipe equipped with at least one hole.

9. A process according to claim 1, wherein the angle formed by the direction of injection of the polymer latex emulsion and the direction of the oscillations takes values ranging from 0 to 180 degrees.

10. Coagulated particles of polymer latex obtained according to claim 1.

11. Coagulated particles of polymer latex obtained according to claim 6.

12. A process according to claim 9, wherein said angle has a value of 90 degrees.

13. Process according to claim 7, characterized in that the oscillatory flow or the impulsive flow is created by moving the fluid within the receptacle according to the said oscillations or impulsions.

14. A process according to claim 1 wherein process is conducted batchwise and an oscillatory flow is created and maintained with said receptacle.

15. A process according to claim 6 wherein process is conducted batchwise and an oscillatory flow is created and maintained with said receptacle.

* * * * *